United States Patent [19]
Van Damme

[11] 3,795,182
[45] Mar. 5, 1974

[54] COFFEE FILTER

[76] Inventor: Pierre Emile Van Damme, 34 Schendelbeckhofstraat, Alost, Belgium

[22] Filed: July 3, 1972

[21] Appl. No.: 268,813

[30] Foreign Application Priority Data
  Jan. 31, 1972   Belgium .............................. 113427

[52] U.S. Cl. ...................... 99/306, 99/77.1, 210/482
[51] Int. Cl. ............................................ B01d 23/02
[58] Field of Search ... 210/446, 448, 450, 451, 452, 210/477, 479, 480, 481, 482; 99/77.1, 295, 304, 306

[56] References Cited
UNITED STATES PATENTS

| | | | |
|---|---|---|---|
| 2,822,273 | 2/1958 | Anderson | 99/295 |
| 3,411,431 | 11/1968 | Moerlini et al. | 99/304 |
| 3,309,980 | 3/1967 | Bozek | 99/77.1 |
| 1,767,544 | 6/1930 | Miller | 210/282 X |
| 3,389,650 | 6/1968 | Michielsen | 99/77.1 |
| 3,083,101 | 3/1963 | Noury | 99/77.1 |

Primary Examiner—Charles N. Hart
Assistant Examiner—F. F. Calvetti
Attorney, Agent, or Firm—Kurt Kelman

[57] ABSTRACT

A coffee filter with a receptacle which is dimensioned to hold a predetermined amount of ground coffee. The coffee receptacle has a flat peripheral top flange which supports a filtering cover sheet extending over the central opening of the coffee receptacle. The cover sheet is sealed to the flange in a zone spaced from the central opening so that it is free to be deformed outwardly under the pressure of the infused coffee in the receptacle. The cover sheet is sealed to the flange either by a bonding seam or a retaining ring, and means is provided to protect the cover sheet when a series of such filters are stacked. A peripheral wall extends upwardly from the top receptacle flange to define a water container.

8 Claims, 5 Drawing Figures

COFFEE FILTER

The present invention relates to a coffee filter designed for a single use.

It is the primary object of this invention to provide a coffee filter of this type which is not only guaranteed to hold a predetermined amount of ground coffee of a given quality without any possibility of tampering with the filter contents but also to make such a filter of the simplest possible construction.

In Belgian patent No. 577,268, a coffee filter has been disclosed wherein the ground coffee is covered by a filtering sheet to protect the coffee. However, this type of filter has never been commercially used with satisfactory results because the ground coffee did not completely fill the covered receptacle. Thus, during shipping, the ground mass of coffee became dislocated so that layers of different thickness were formed, making uniform infusion impossible. It was impossible to fill the receptacle completely with the prior art structures because allowance had to be made for the swelling of the ground coffee when wetted with water during infusion when its volume increases by 20 to 25 percent. If the receptacle had been completely filled with coffee, the swollen volume of coffee would have burst the cover sheet since the free area of the cover sheet over the receptacle opening was equal to the area of the opening.

In accordance with the invention, the receptacle is dimensioned to receive and hold a predetermined amount of ground coffee when it is completely filled so that the volume of the receptacle corresponds exactly to the volume of the coffee therein. The filtering cover sheet is supported on a flat peripheral top flange defining a central opening for the receptacle and extends over the central opening. The cover sheet is sealed to the flange in a zone spaced from the central opening, however, so that it may be outwardly deformed under pressure of the ground coffee held in the receptacle under the cover sheet when the coffee is swollen when wetted by water. Thus, the cover sheet will yield under the pressure without danger of rupture. The coffee receptacle has an apertured bottom and means is provided for retaining the filtering cover sheet in sealing engagement with the flange. Furthermore, means is also provided for protecting the sheet, particularly during shipping. A peripheral wall extends from the top coffee receptacle flange and defines a container for water above the cover sheet and coffee receptacle.

The above and other objects, advantages and features of the present invention will become more apparent from the following description of certain now preferred embodiments thereof, taken in conjunction with the accompanying drawing wherein FIG. 1 is a vertical section of one embodiment of a coffee filter according to this invention;

Figure 1:
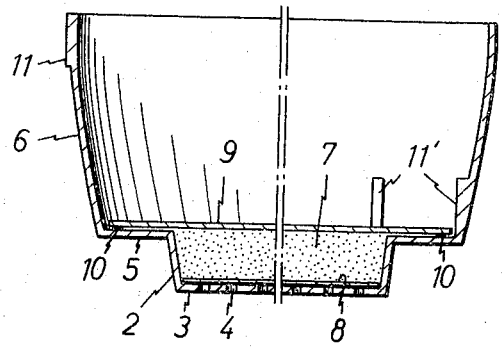

Referring now to the drawing, wherein like reference numerals designate like parts operating in a like manner to avoid prolixity in the description, FIG. 1 shows a coffee filter 1 which comprises a receptacle 2 for the ground coffee 7. The receptacle has a bottom 3 with orifices 4 and a top peripheral flange 5 which has a flat support surface for the coffee filtering sheet 9 which closes off the receptacle. A coffee filtering sheet 8 is placed over the apertured bottom 3 of the receptacle which is dimensioned to hold the desired amount of ground coffee between the sheets 8 and 9. An uninterrupted bonding seam 10 attaches the filter sheet 9 to the peripheral flange 5 to make it integral therewith, the bonding seam going around the entire circumference of sheet 9 and being radially spaced from the open top of the coffee receptacle 2.

A side wall extends upwardly from flange 5 to form a container for water.

As shown in FIG. 1, the ground coffee 7 is held irremovably in receptacle 2 under sheet 9 and is maintained in this receptacle by this top sheet, the exact amount of coffee desired filling the entire receptacle and the flat sheet 9 closing off the open top of the receptacle and being sealed thereto.

When the infusion is started by filling the container 6 with water, the ground coffee is moistened and swells under the action of the water penetrating therethrough while the covering sheet 9 will be deformed only slightly, considering the relatively large surface of the sheet subjected to the swollen mass of ground coffee. The flexibility of the filtering sheet 9 permits the free swelling of the coffee.

Since the filters are stacked during shipping and, in addition, it is desirable to vacuum pack the filters to retain the aroma of the coffee, the filtering sheet 9 must be protected so that it is not damaged during manipulation. For this purpose, suitably positioned abutments are provided.

Figure 2:
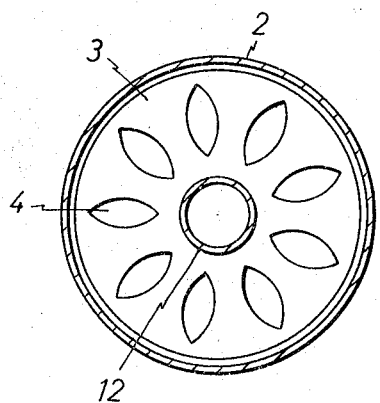
FIG. 2 is a plan view of the bottom of a coffee receptacle with a support rib.
Figure 2A:
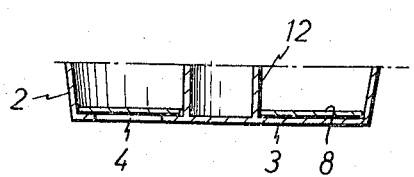
FIG. 2a is a vertical section of the receptacle of FIG. 2.

As shown in FIG. 1, protective abutments 11 may be provided around the upper rim of the container 6 and/or it is possible to mounted abutments 11' at the bottom of the water container adjacent flange 5. As shown in the modification of FIGS. 2 and 2a, it is also possible to mount an annular support or reinforcing rib 12 in the coffee receptacle 3 extending from the bottom of the receptacle to the open top thereof.

The protective abutments or ribs operate as follows:

When a series of filters 1 are stacked, the peripheral abutment 11 serves to retain the upper rim of the lower one in the series of stacked filters in a position so that the bottom 3 of the higher filter in this series is level with the filtering sheet 9 of the lower filter, i.e. the stacked filters are so spaced by the abutment 11 that the filtering sheets 9 will not be damaged by the superposed filters.

The abutments or shoulders 11' are arranged so that they will receive and support the lower face of the peripheral flange 5 of the superposed filter and are so dimensioned that the bottom 3 of the receptacle 2 of the superposed filter is level with the filtering sheet 9 of the lower filter.

In the modification of FIGS. 2 and 2a, the filtering sheet 9 is supported solely by the annular rib 12 which prevents the damaging collapse of this sheet by the pressure of the superposed filter. While the support rib 12 has been shown as annular, it may, of course, have any other suitable configuration, such as cross- or star-shaped, as long as it provides sufficient support for the sheet 9 to prevent its collapse under pressure.

Figure 3:
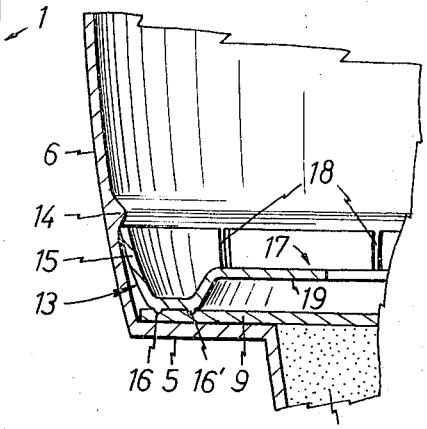
FIG. 3 is a partial vertical section of another filter embodiment.
Figure 4:
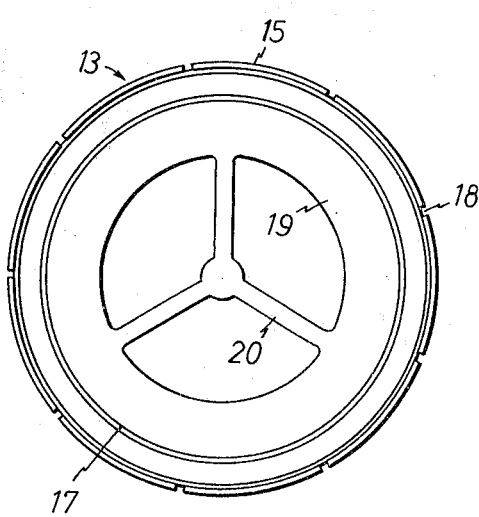
FIG. 4 is a plan view of a retaining ring used in the embodiment of FIG. 3.

In the embodiments of FIGS. 3 and 4, the filtering sheet 9 is pressed against the flat flange 5 of the coffee receptacle by a retaining ring 13 held in position by a peripheral rib 14 projecting radially inwardly from the wall of water container 6. The retaining ring has a plurality of elastically deformable engaging elements or flaps 15 extending somewhat obliquely in respect of container wall 6. Concentric ribs 16, 16' project from the base of retaining ring 13 to engage the covering sheet 9 and press it against the flange 5 to form a tight seal at a point spaced from the open top of the coffee receptacle 2. The retaining ring is centrally reinforced at 17 by a recessed annular portion 19 and connecting strips 20.

The elastic deformability of the flaps 15 is increased by the slits 18 therebetween and, since these flaps are a little larger than the space between the peripheral rib 14 and the covering sheet 9, the retaining ring will exert considerable pressure against sheet 9 when it is inserted into this space, with the deformed flaps 15 jammed under rib 14, the concentric ribs 16, 16' of the retaining ring gripping the sheet to hold it in sealing engagement with the flange 5.

The recessed reinforcement 17 of the retaining ring will permit the covering sheet 9 to become deformed when the coffee 7 in the receptacle begins to swell during infusion and, if desired, the elasticity of the reinforcement material may aid in this deformation.

This embodiment of the invention also assures the inviolability of the filter because any attempt to remove the retaining ring will tend to force flaps 15 apart, thus producing increased downward pressure of the concentric rings 16, 16' against sheet 9, any disengagement being possible only by breaking reinforcement 17. It should be noted that the swelling of the coffee, with its resultant pressure against reinforcement 17 will have the same effect, i.e. it will more strongly press the peripheral border of covering sheet 9 against flange 5 by increasing the downward pressure on ribs 16, 16', thus keeping the tight sealing engagement of the filtering sheet with its supporting flange.

The protection of the filtering sheet 9 during stacking of a series of superposed filters is obtained in the last-described embodiment by the reinforcement 17 of the retaining ring.

It may be noted that the filtering sheet 9 cannot be damaged by any sudden spurt of water when the infusion is started because, at that point, the sheet is fully supported by the underlying layer of ground coffee.

The lower filtering sheet 8, when used, is preferably also made integral with the bottom of the receptacle 2 by a peripheral bonding seam similar to that used in the embodiment of FIG. 1 for the upper or covering sheet 9. When such a lower filtering sheet is used, the orifices 4 in bottom 3 may be relatively large and any type of grind of coffee may be used without risking loss of coffee during infusion.

Many types of filtering cloth or paper are known for the purpose of filtering ground coffee in coffee makers during infusion and any such disposable filters may be used for the purposes of the present invention. It has been found most useful and it is preferred to use non-woven webs as filtering sheets, and non-woven webs of glass fibers are most preferred. Any type of edible adhesive may be used for the purpose of bonding the filtering sheet to the flange 5 or the bottom 3, respectively.

While the invention has been described in connection with certain now preferred specific embodiments, it will be clearly understood that many modifications and variations may occur to those skilled in the art, particularly after benefiting from the present teaching, without departing from the spirit and scope of this invention as defined in the appended claims.

I claim:

1. A coffee filter and receptacle which comprises in combination:
    A. a receptacle dimensioned to receive and hold a predetermined amount of ground coffee, the receptacle including:
        1. an apertured bottom,
        2. a flat peripheral top flange extending radially and defining by its inner edges a central opening for the receptacle, and
        3. ground coffee disposed within the receptacle over the apertured bottom and to the central opening;
    B. a unitary filtering cover sheet supported near the outer peripheral edge of the top flange and extending in a horizontal plane over the central opening,
        1. said cover sheet formed of non-woven web which is capable of passing water while retaining passage of coffee grounds and being sufficiently flexible to permit free swelling of the coffee grounds,
        2. said cover sheet disposed to contain the coffee grounds without dislocation thereof and thereby permitting uniform infusion of the coffee grounds with water,
        3. said cover sheet being supported onto the flange only in a zone spaced from the central opening so that said cover sheet outwardly deforms without rupture under pressure of the ground coffee held in the receptacle under the cover sheet when coffee becomes freely swollen when wetted by water,
    C. means for retaining the filtering cover sheet in sealing engagement with the top flange,
    D. a peripheral wall extending radially and vertically from the flat peripheral top flange and defining a container for water above the cover sheet and coffee receptacle, said peripheral wall and said receptacle being constructed and arranged to receive a plurality of stocked receptacles, and (E) means for protecting the cover sheet from damage by preventing contact of said apertured bottom with the cover sheet when a plurality of said receptacles are stocked one into another.

2. The coffee filter of claim 1, wherein the means for retaining the filtering cover sheet in sealing engagement with the flange is a bonding seam.

3. The coffee filter of claim 2, wherein the bonding seam is an uninterrupted seam along the periphery of the sheet.

4. The coffee filter of claim 1, wherein the means for protecting the filtering cover sheet comprises an abutment means on the peripheral wall of the water container, the abutment means being dimensioned and positioned so as to delimit penetration of a superposed one of the filters into a lower one of the filters in a stacked series of said filters whereby the bottom of the superposed filter in the stacked series will be level with the filtering cover sheet of the lower filter in the series, thus protecting the cover sheet from damage and aiding in its retention over the coffee in the receptacle during shipping of the stacked series of filters.

5. The coffee filter of claim 1, further comprising a supporting rib extending from the apertured bottom of the receptacle to the central opening thereof to support the filtering cover sheet.

6. The coffee filter of claim 1, wherein the means for retaining the filtering cover sheet in sealing engagement with the flange comprises a retaining ring, an annular rib projecting radially inwardly from the peripheral container wall, the retaining ring comprising elastically deformable engaging elements separated by slits, and the engaging elements being so shaped and dimensioned as to exert a downward pressure on said zone of the cover sheet when in elastic engagement with the annular rib.

7. The coffee filter of claim 6, wherein the retaining ring further comprises a central reinforcement inwardly of said zone, the reinforcement comprising a recessed annular portion and centrally positioned connecting strips.

8. The coffee filter and receptacle of claim 1 wherein the filter cover sheet is a non-woven web of glass-fiber.

* * * * *